US008717503B2

(12) United States Patent
Kikkawa et al.

(10) Patent No.: US 8,717,503 B2
(45) Date of Patent: May 6, 2014

(54) AUDIO OUTPUT DEVICE CONNECTABLE WITH PLURALITY OF DEVICES AND METHOD OF CONTROLLING THE SAME

(75) Inventors: Teruki Kikkawa, Yokohama (JP); Michihiro Izumi, Kashiwa (JP); Yoshikazu Shibamiya, Tokyo (JP); Yasushi Shikata, Tama (JP); Hirofumi Urabe, Kawasaki (JP); Daisuke Takayanagi, Kawasaki (JP); Chika Masuda, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/633,685

(22) Filed: Dec. 8, 2009

(65) Prior Publication Data
US 2010/0141845 A1   Jun. 10, 2010

(30) Foreign Application Priority Data

Dec. 9, 2008  (JP) ................................. 2008-313394

(51) Int. Cl.
*H04N 5/60* (2006.01)

(52) U.S. Cl.
USPC ............................. 348/738; 348/552; 348/730

(58) Field of Classification Search
CPC ............. H04N 5/60; H04N 5/63; H04N 5/76; H04N 2201/3264; H04N 5/445; H04N 5/765; H04N 5/772; H04N 5/775
USPC ......... 348/738, 725, 553, 569, 715–720, 513, 348/730, 552; 386/231, 219, 220, 230, 334, 386/337–339, 353–357
See application file for complete search history.

(56) References Cited

U.S. PATENT DOCUMENTS

| 5,774,192 | A  | * | 6/1998 | Koyama ........................ 348/715 |
| 8,090,235 | B2 | * | 1/2012 | Waki ............................. 386/231 |
| 2005/0280744 | A1 | * | 12/2005 | Shin ............................. 348/738 |
| 2009/0284665 | A1 | * | 11/2009 | Mizoguchi et al. ........... 348/738 |

FOREIGN PATENT DOCUMENTS

| JP | 2007-124469 A | 5/2007 |
| JP | 2007-179707 A | 7/2007 |
| JP | 2008-079135 A | 4/2008 |
| JP | 2008-283469 A | 11/2008 |
| WO | 2008/072695 A | 6/2008 |
| WO | 2008/072695 A1 | 6/2008 |

\* cited by examiner

*Primary Examiner* — Trang U Tran
(74) *Attorney, Agent, or Firm* — Canon USA, Inc., IP Division

(57) ABSTRACT

In a television device (audio output device), audio output performance information of the television device is pre-stored in an EDID-ROM. When an AV amplifier is connected to the television device, a control unit rewrites "2ch" audio output performance information of the television device stored in the EDID-ROM of an HDMI port which is different from the HDMI port to which the AV amplifier is connected, to "5.1ch" audio output performance information of the AV amplifier.

13 Claims, 8 Drawing Sheets

FIG. 6

| PHYSICAL ADDRESS | LOGICAL ADDRESS | DEVICE TYPE | AUDIO OUTPUT PERFORMANCE | SPEAKER POSITION |
|---|---|---|---|---|
| 1.0.0.0 (HDMI PORT 105) | 4 | Playback Device | — | — |
| 2.0.0.0 (HDMI PORT 106) | 5 | Audio System | 5.1ch | FL, FR, BL, BR, C, LFE |

AUDIO OUTPUT DEVICE CONNECTABLE WITH PLURALITY OF DEVICES AND METHOD OF CONTROLLING THE SAME

BACKGROUND OF THE INVENTION

1. Field of the Invention

The present invention relates to an audio output device connectable with a plurality of devices and a method for controlling the same.

2. Description of the Related Art

An image and audio playback system may include a playback device such as a video camera or recorder, an audio output device such as a television device having an internal speaker, and an audio system such as an AV amplifier having an external speaker. In recent years, an interface termed a HDMI (High-Definition Multimedia Interface) has been used in which these devices are connected with a single cable to enable transmission of image data, audio data or control data. HDMI has the advantage that a user can avoid a troublesome operation of connecting a plurality of cables such as image cables and audio cables since devices can be connected using a single cable. The popularity of HDMI-compliant goods has resulted in an increase in television devices provided with a plurality of HDMI terminals.

HDMI uses three transfer lines including a transition minimized differential signaling (TMDS) line, consumer electronics control (CEC) line and a display data channel (DDC) line. The TMDS line transmits image data, audio data and additional data. The CEC line transmits control data (CEC commands) for controlling connected equipment. Communication using CEC commands enables controlling among connected equipments.

The DDC line transmits data tables termed extended display identification data (EDID). The DDC line is also used in confirmation processes for copyright protection processes termed high-bandwidth digital content protection (HDCP). For example, a video camera acquires an EDID stored in an AV amplifier or television device for connection, confirms the equipment capability (audio output performance or image display performance) and outputs audio data or image data corresponding to those capacities.

A television device provided with a plurality of HDMI ports (HDMI connection terminals) will be considered. When a plurality of EDID-ROMs is provided corresponding to a plurality of HDMI ports, if a video camera is connected to any one of those HDMI ports, equipment performance information (audio output performance information or image display performance information) of the television device can be acquired from the corresponding EDID-ROM.

However, the connection arrangement of equipment or the power supply state of the equipment sometimes may not allow a video camera to output audio data or image data as playback content in a suitable format.

For example, when a video camera (playback device), AV amplifier (audio system) and television device (audio output device) are connected in series, the video camera may not be able to access the EDID-ROM of the television device in a case where the power supply of the AV amplifier is OFF. As a result, since the video camera cannot confirm the equipment performance of the television device (audio output performance or image display performance), the problem arises that audio data and image data cannot be output in a suitable format.

Japanese Patent Application Laid-Open No. 2007-124469 discusses a system in which source equipment, an AV amplifier and a television are connected in series. In this system, even when the AV amplifier is in a power standby mode, it is possible to watch the playback content of the source equipment. According to the system, the AV amplifier is provided with a data table (EDID) indicating a signal playback performance to the source equipment. While the AV amplifier is ON, data is stored in the data table indicating the signal playback performance of the AV amplifier. When the AV amplifier is OFF, data indicating the signal playback performance of the television is rewritten in the data table, which is equivalent to a state in which the source equipment and the television are directly connected.

Japanese Patent Application Laid-Open No. 2007-179707 discusses a system in which a DVD player, AV amplifier and TV are connected in series and discusses a technique of power supply control for respective equipment according to the format of the playback content. More precisely, the DVD player determines the presence or the absence of an audio signal and image signal of the playback content as well as the format. When the playback content is only an image signal, the TV power supply is controlled to be ON and when the playback content is only an audio signal, the AV amplifier is controlled to be ON. Furthermore when the playback content includes both an image signal and an audio signal and the audio format is 5.1 ch, the power supply of both the TV and the AV amplifier are controlled to be ON to enable audio output from the AV amplifier and image display by the TV.

On the other hand, an arrangement is considered in which an AV amplifier (audio system) is connected to one HDMI port of a television device (audio output device) and a video camera (playback device) is connected to another HDMI port (hereafter "parallel connection"). In this case, the video camera can access the EDID-ROM of the television device. As a result, when video camera confirms the audio output performance of 2 ch of the television device, even when the audio format of the playback content is 5.1 ch, audio data downmixed into 2 ch is output. Thus, even in the event that the AV amplifier has a 5.1 ch audio output performance, the audio output performance of the AV amplifier is not effectively utilized and a sufficient audio effect for the playback content is not obtained.

Thus, the problem arises that, in view of the format of the playback content, a user must correctly determine whether the playback device, the audio system and the audio output device are to be connected in series or whether the audio system and the playback device are to be connected in parallel to the audio output device. When a suitable connection arrangement is not realized, audio data as the playback content is not output in a suitable format and a sufficient audio effect for the playback content is not obtained.

Therefore, when the connection arrangement of the playback device, the audio system and the audio output device is not suitable, the audio data as the playback content is not output in a suitable format and a sufficient audio effect for the playback content has not been obtained.

The techniques discussed in Japanese Patent Application Laid-Open No. 2007-124469 and Japanese Patent Application Laid-Open No. 2007-179707 are premised on serial connection of the playback device, audio system and audio output device and do not consider other connection arrangements. For example, an arrangement in which the audio system and the playback device are connected in parallel to the audio output device is not considered.

SUMMARY OF THE INVENTION

The present invention is directed to an audio output device and a method of controlling the same, which enable output of audio data as playback content in a suitable format irrespective of the connection arrangement of the playback device, audio system and audio output device.

According to an aspect of the present invention, an audio output device includes a first and a second connection terminal, a first and a second storage unit provided corresponding to the first and second connection terminals, which are configured to pre-store audio output performance information of the audio output device, respectively, and a control unit configured to acquire audio output performance information of the audio system when the audio system is connected to the first connection terminal, and perform control to rewrite audio output performance information of the audio output device stored in the second storage unit to the acquired audio output performance information of the audio system.

Further features and aspects of the present invention will become apparent from the following detailed description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of an equipment management table retained by an equipment management unit of the television device.

DESCRIPTION OF THE EMBODIMENTS

In the absence of a specific statement to the contrary, the function, shape or relative position of constituent components described in the embodiments of the present specification is not for the purpose of limiting the scope of the invention. Furthermore in the absence of a specific re-statement, the shape or function of components or the arrangement described in the description hereafter is the same as the initial description.

Figure 1:
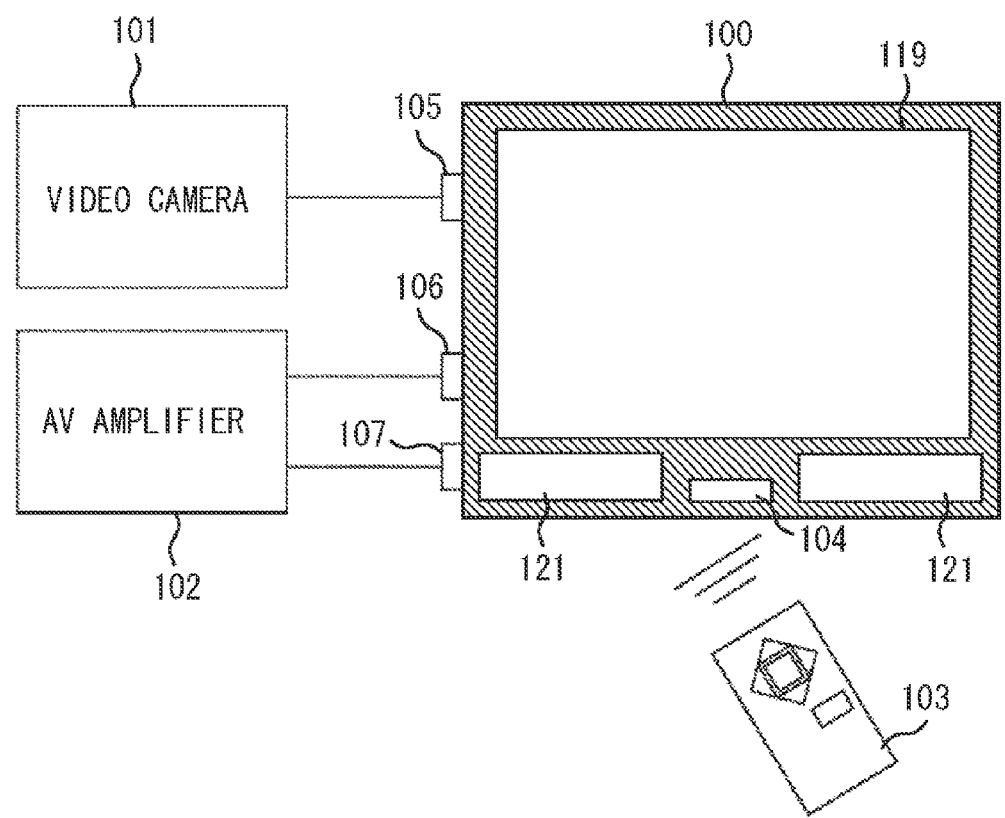
FIG. 1 is a block diagram illustrating a schematic arrangement of an image and audio playback system according to a first embodiment of the present invention.

FIG. 1 is a block diagram illustrating a schematic arrangement of an image and audio playback system according to a first embodiment of the present invention. In FIG. 1, the image and audio playback system is formed by a television device 100 which is an audio output device, a video camera 101 which is a playback device and an AV amplifier 102 which is an audio system.

In FIG. 1, although, as an audio output device example, a television device 100 which has an internal speaker is described as an example, the audio output device may be any device having a speaker outputting audio such as a personal computer having an external speaker connected thereto. Furthermore, although, as a playback device example, a video camera 101 having a content playback function is described, the playback device may be any device having a playback function for the content including audio such as a hard disk recorder or a music player. Furthermore, although, as an audio system example, an AV amplifier 102 with an external speaker is described, the audio system may be any device having a speaker outputting high-performance audio.

The video camera 101 is connected by an HDMI cable to an HDMI port (second connection terminal) 105 of the television device 100 and the AV amplifier 102 is connected through an HDMI cable to the HDMI port (first connection terminal) 106 (parallel connection). Furthermore, the AV amplifier 102 is connected to an optical digital terminal 107 by an optical digital cable.

The video camera 101 is a device which can playback multichannel audio data such a 5.1 ch. Image data and audio data played back by the video camera 101 is input into the television device 100 through the HDMI cable. The input image data is displayed on an image display unit 119 such as a liquid crystal display. The input audio data is output from an audio output unit 121 such as an internal speaker or from an external speaker of the AV amplifier 102 through an optical digital cable.

A user can remotely operate the television device 100 using a remote controller 103. The remote controller 103 generates a control signal in response to a user operation, modulates the control signal to an infrared signal and transmits the signal to the television device 100. When an infrared light reception unit 104 of the television device 100 receives the infrared signal from the remote controller 103, television device 100 is operated in accordance with a user operation.

Figure 2:
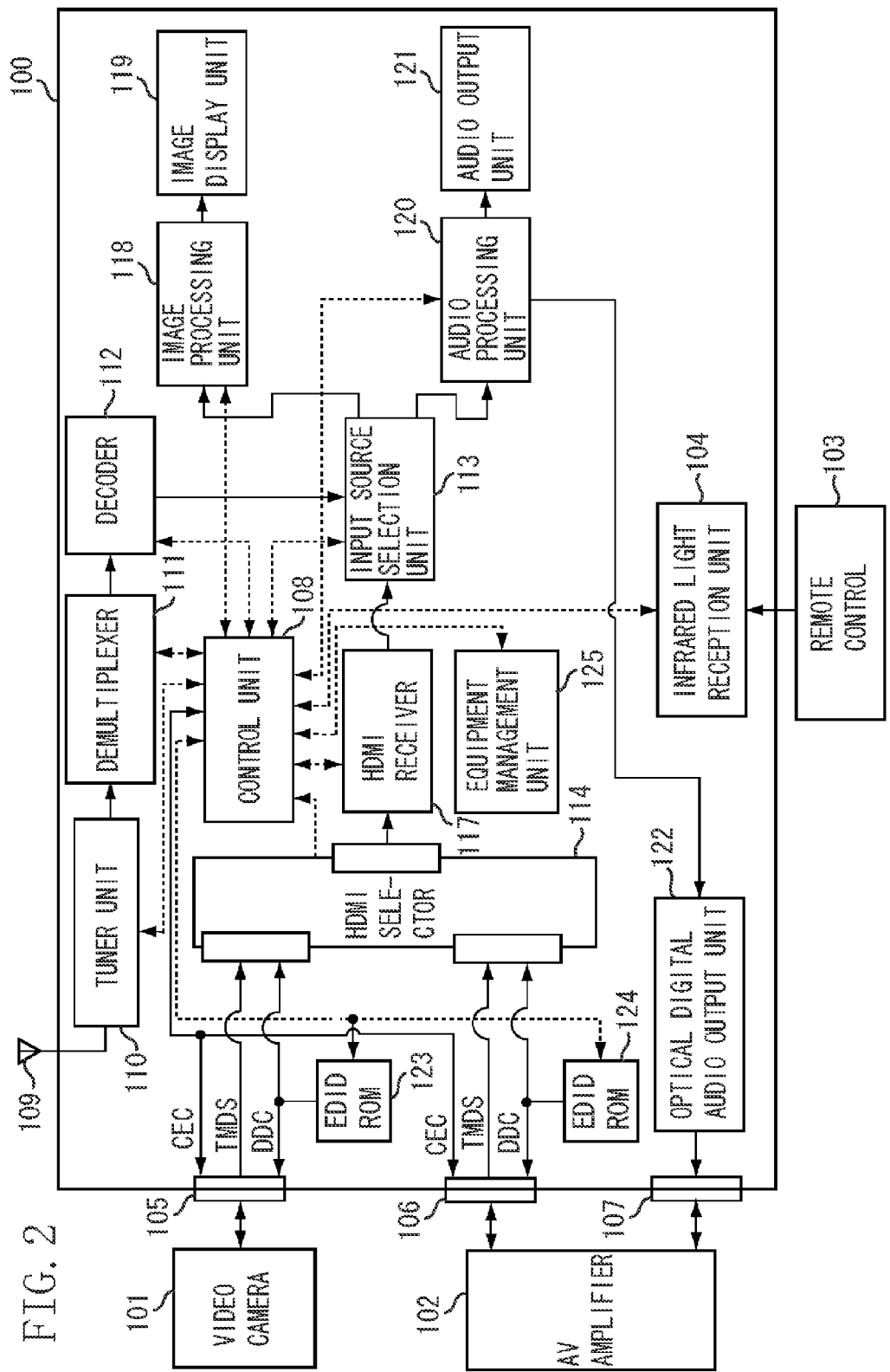
FIG. 2 is a block diagram illustrating a schematic example of a television device (audio output device) illustrated in FIG. 1.

FIG. 2 is a block diagram illustrating a schematic example of a television device (audio output device). An antenna is connected to the television device 100. The television device 100 is provided with an infrared light reception unit 104, HDMI ports 105 and 106, optical digital terminal 107, control unit 108, tuner unit 110, demultiplexer 111, decoder 112, input source selection unit 113 and HDMI selector 114. The television device 100 is further provided with an HDMI receiver 117, image processing unit 118, image display unit 119, audio processing unit 120, audio output unit 121, optical digital audio output unit 122, EDID-ROM 123 and 124, and equipment management unit 125.

The control unit 108 is, for example, a central processing unit (CPU) connected to a read-only memory (ROM) or random-access memory (RAM) (not shown) and controls the overall operation of the television device in accordance with a program stored in the ROM while using the RAM as a work memory. The control unit 108 generates a control signal and various commands for controlling the television device 100 based on a control signal transmitted from the remote controller 103 in response to a user operation.

The tuner unit 110 performs the processing such as demodulation and error correction for transmitted signals input from an antenna 109 and generates a transport stream (hereafter "TS"). The tuner unit 110 performs descrambling processing on the generated TS and outputs the resulting signal to the demultiplexer 111. The demultiplexer 111 extracts desired image data and audio data from the TS formed by a plurality of inputted channels and outputs the data to a decoder 112. The decoder 112 performs decoding processing on image data and audio data. The image data and audio data processed in the decoder 112 is output to the input source selection unit 113.

The HDMI selector 114 selects either one of the HDMI ports 105 and 106 in response to a switch signal from the control unit 108. One port is selected by the HDMI selector 114 from a plurality of HDMI ports as an input destination for image data and audio data. The HDMI receiver 117 performs a decoding operation on the image data and audio data input from the HDMI port 105 or 106 through the HDMI selector 114 and outputs the resulting signal to the input source selection unit 113.

The input source selection unit 113 selects one input source from decoder 112 and the HDMI receiver 117 in response to a control signal from the control unit 108. The image data from the input source selected by the input source selection unit 113 is supplied to the image processing unit 118 and after a process for high image quality such as a gamma process is carried out, the image is displayed on the image display unit 119. In the same manner, audio data from the input source selected by the input source selection unit 113 is supplied to the audio processing unit 120 and after sound quality enhancement processing and the like is carried out, the audio is output from the audio output unit 121. However, when control is performed to output audio from the AV amplifier 102, the audio processing unit 120 performs a scrambling process to enable optical digital output of audio data through an optical digital audio output unit 122. For example, when the format of the audio data is 2 ch, audio is output from an audio output unit 121 stored in the television device 100. On the other hand, when the format of the audio data is 5.1 ch, audio is output from the optical digital audio output unit 122 to the AV amplifier 102. In this case, the audio output unit 121 incorporated in the television device 100 supports a 2 ch audio format and the AV amplifier 102 supports a 5.1 ch audio format.

The HDMI ports 105 and 106 are provided respectively with a TMDS line and a DDC line. Furthermore, a CEC line is provided as a control signal line enabling communication between the video camera 101 and the AV amplifier 102 connected to the HDMI port 105 and 106. The control unit 108 is provided with a CEC command transmission and reception unit and a CEC analysis unit (not shown). The analysis unit and transmission and reception unit provided in the control unit 108 are controlled by a program pre-stored in the ROM.

The TMDS line transmits image data, audio data and additional data output from the video camera 101 or the AV amplifier 102 to the television device 100. The DDC line is a line for transmitting and receiving EDID to and from the television device 100 and the video camera 101 or the television device 100 and the AV amplifier 102. The TMDS line and the DDC line are connected between the HDMI selector 114 and the HDMI ports 105 and 106. EDID-ROMs 123 and 124 storing equipment performance information and the like are connected with the DDC line. The EDID-ROM 123 (second storage unit) and the EDID-ROM 124 (first storage unit) are a rewritable volatile memory (memory medium) and pre-stores audio output performance information or image display performance information of the television device 100. In addition, physical address information of the corresponding HDMI port is stored. In the present embodiment, the control unit 108 performs control to rewrite the EDID-ROM.

The CEC line is a line enabling CEC communication between the television device 100 and the video camera 101, or between the television device 100 and the AV amplifier 102. The CEC line is connected by a bus connection between the control unit 108 and the HDMI ports 105 and 106. When a CEC command is received from the connection equipment, the CEC analysis unit of the control unit 108 performs command analysis. Then, equipment information such as a physical address assigned to the HDMI port or a logical address showing the device type is stored in the equipment management unit 125. The device type is defined by an HDMI standard and represents the type of a device including recorder, player or AV amplifier.

Figure 3:
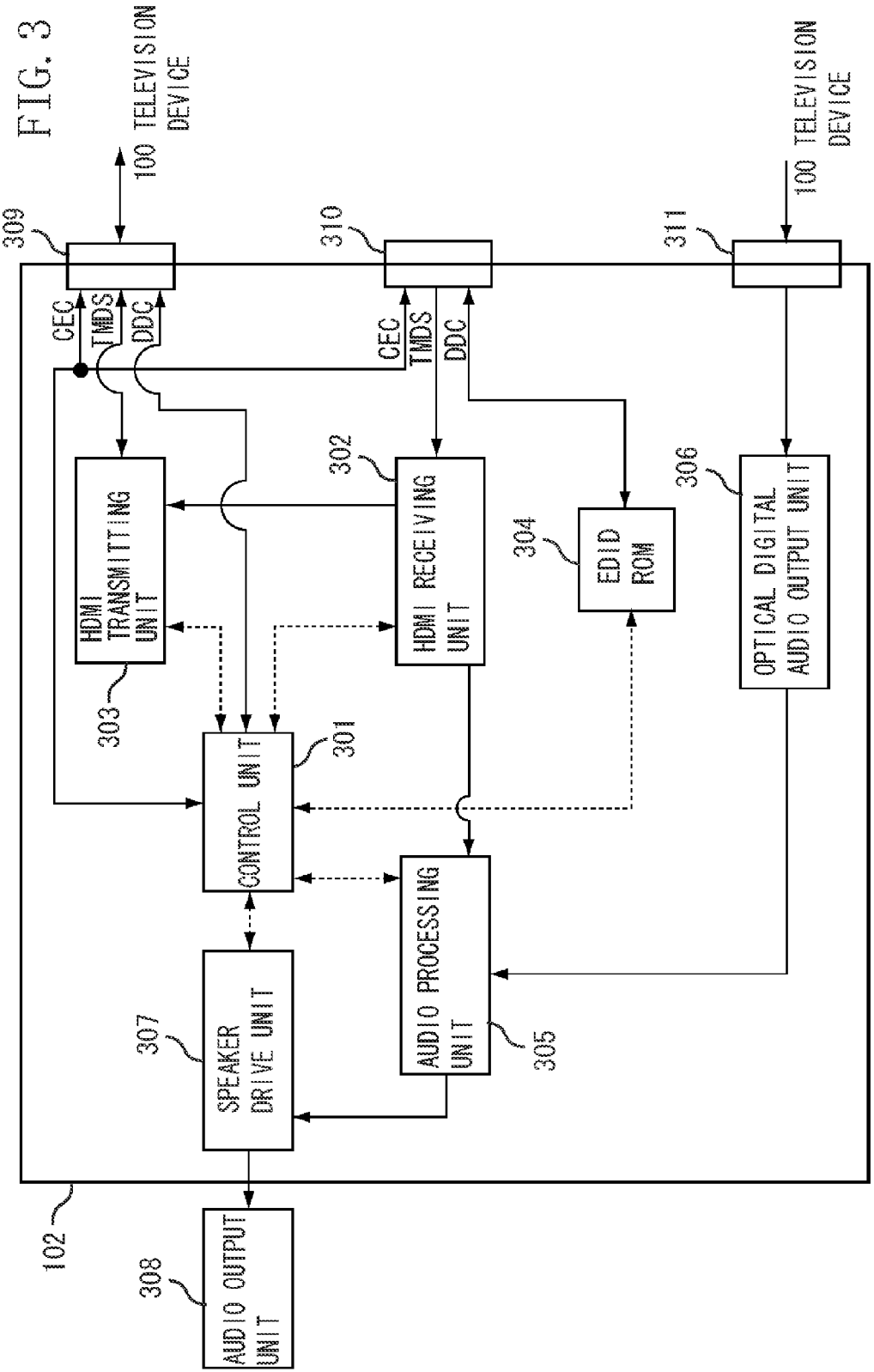
FIG. 3 is a block diagram illustrating a schematic example of an AV amplifier (audio system) illustrated in FIG. 1.

FIG. 3 is a block diagram illustrating a schematic example of an AV amplifier (audio system). In FIG. 3, the AV amplifier 102 is provided with a control unit 301, a HDMI receiving unit 302, a HDMI transmission unit 303, EDID-ROM 304, audio processing unit 305, optical digital audio input unit 306 and a speaker drive unit 307. Further, the AV amplifier 102 is provided with HDMI ports 309 and 310 and an optical digital terminal 311. Furthermore, an audio output unit 308 such as an external speaker is connected to the AV amplifier 102.

The control unit 301 controls the overall operation of the AV amplifier 102. The control unit 301 exchanges various types of commands with equipment connected to the HDMI ports 309 and 310.

The playback device such as a hard disk recorder or video camera is connected to the HDMI port 310. The HDMI receiving unit 302 transfers audio data received from the playback device connected to the HDMI port 310, to the audio processing unit 305. Furthermore, the HDMI receiving unit 302 transfers image data received from the playback device connected to the HDMI port 310, to the HDMI transmitting unit 303 to resend the data from the HDMI port 309. The HDMI transmitting unit 303 transmits image data to the television device 100 connected to the HDMI port 309. However, audio data received by the HDMI receiving unit 302 can also be transmitted to the television device 100 from the HDMI transmitting unit 303.

Audio output performance information of the AV amplifier 102 and information such as physical addresses for HDMI ports used during CEC communication are stored in the EDID-ROM 304. The information stored in the EDID-ROM 304 may be rewritten by the control unit 301 in response to the state of the power supply.

The optical digital audio input unit 306 descrambles the audio data input through the optical digital cable from the television device 100 connected to the optical digital terminal 311 and performs a decoding operation on the compressed audio data. The audio data processed by the optical digital audio input unit 306 is output to the audio processing unit 305. After the audio processing unit 305 performs a process such as amplification processing on audio data input from the HDMI receiving unit 302 or the optical digital audio input unit 306, the signal is output to the audio output unit 308 through the speaker drive unit 307.

Figure 4:
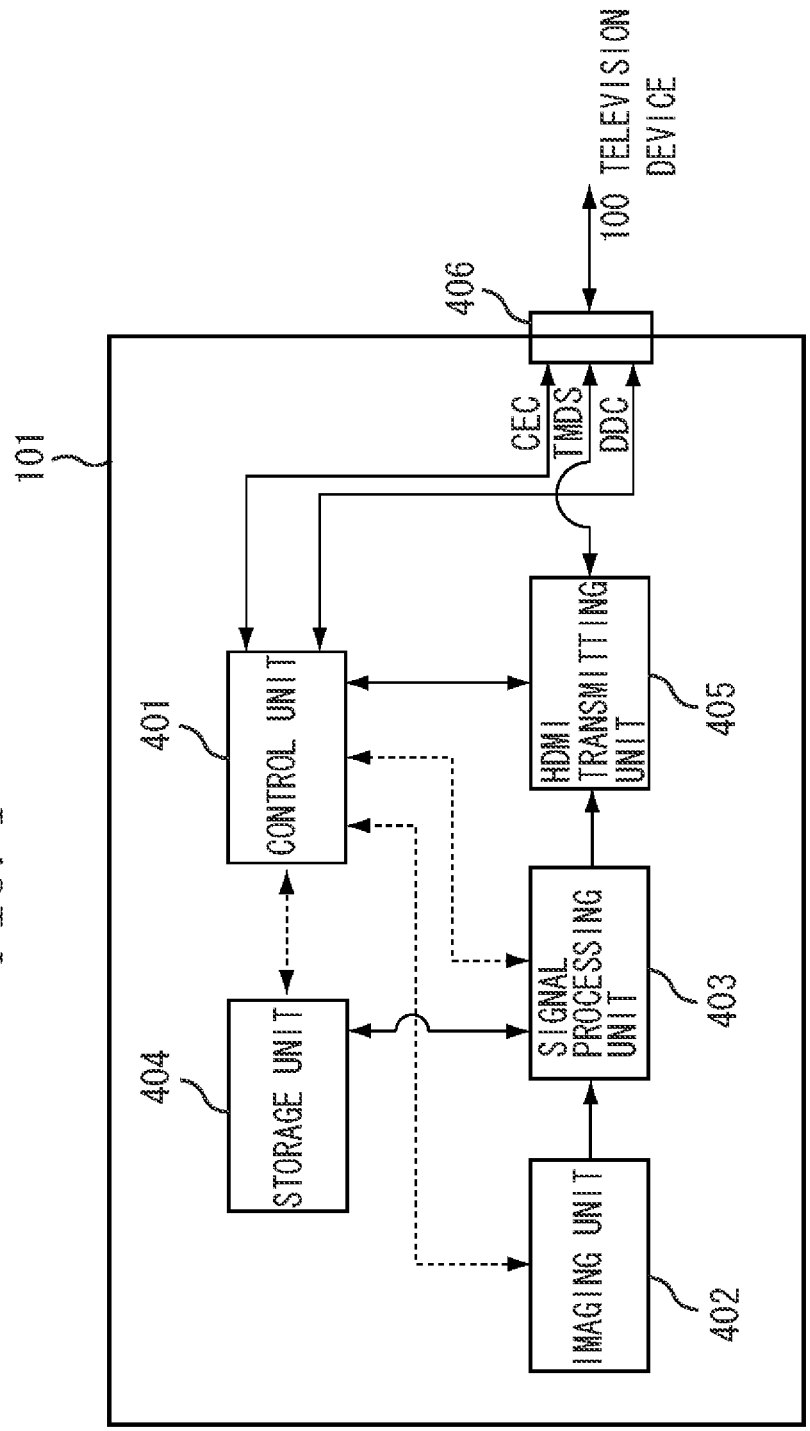
FIG. 4 is a block diagram illustrating a schematic example of a video camera (playback device) illustrated in FIG. 1.

FIG. 4 is a block diagram illustrating a schematic example of a video camera (playback device). In FIG. 4, the video camera 101 includes a control unit 401, imaging unit 402, signal processing unit 403, storage unit 404, HDMI transmitting unit 405 and HDMI port 406.

The control unit 401 controls the overall operation of the video camera 101. The control unit 401 exchanges various types of commands with the television device 100 connected to the HDMI port 406 using the CEC line and the DDC line.

The imaging unit 402 is provided with an imaging lens and an imaging element, performs analogue to digital (A/D) conversion of output signals from the imaging element and inputs such signals to the signal processing unit 403. The signal processing unit 403 is formed by a level correction unit, white balance correction unit, γ correction unit, color processing unit, color-difference conversion unit and encoding/decoding unit (which are not shown). When recording captured images, the signal processing unit 403 performs various correction processes, color processes and encoding processes on a signal from the imaging unit 402. The content encoded by the signal processing unit 403 is stored in the storage unit 404. During playback, the signal processing unit 403 reads the content stored in the storage unit 404, executes decoding processing and outputs the resulting signal to the HDMI transmitting unit 405. Format information such as directory information for the content stored in the storage unit 404, audio format related to the content or image size information are managed as a content profile.

The HDMI transmitting unit 405 transmits image data and audio data based on equipment performance information (audio output performance information, image display performance information) stored in the EDID-ROM of the television device 100 connected to the HDMI port 406.

The processing of the television device 100 according to a first embodiment of the present invention will be described making reference to the flowchart in FIG. 5 and the block diagram referred to above.

Figure 5:
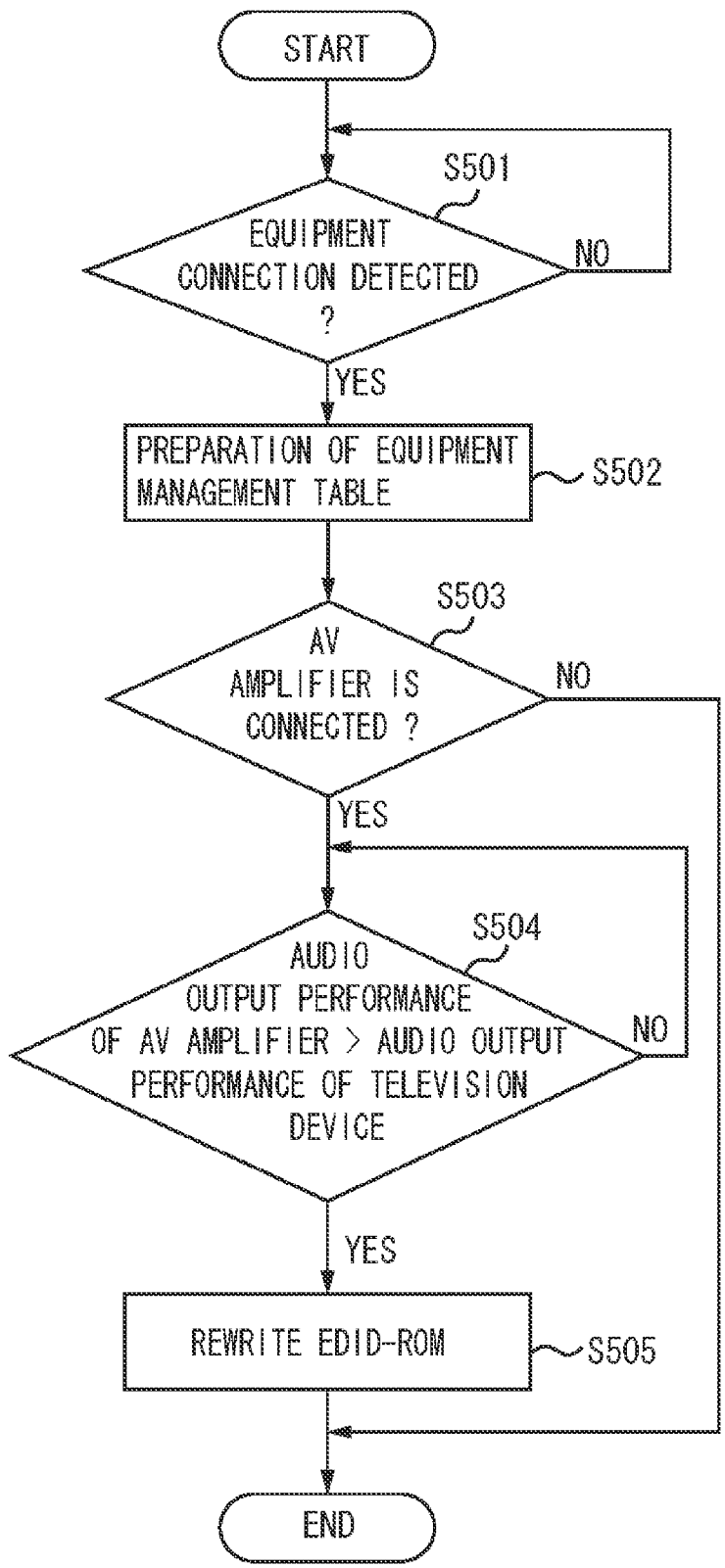
FIG. 5 is a flowchart illustrating an example of the operation when equipment is connected to the television device.

FIG. 5 is a flowchart illustrating an example of the operation when equipment is connected to the television device 100. When the equipment is connected with the television device 100, a 5V voltage is supplied from the connected equipment to a 5V Power line (not shown). In step S501, when the control unit 108 of the television device 100 detects the connected equipment from a variation in the voltage value of the 5V Power line, a process proceeds to step S502.

In step S502, the control unit 108 transmits polling messages in sequence to each pre-prepared logical address and acquires a device type of the connected equipment. The control unit 108 can acquire a device type of the connected equipment by confirming the logical address which has made the Ack response to the transmitted polling message. The details of the confirmation process are determined by the HDMI standard. The control unit 108 transmits a CEC command requesting equipment information such as the vendor-ID or the equipment name of the connected equipment. When the control unit 108 receives the CEC command answering the equipment information, the command is decoded and supplied to the CEC analysis unit. The CEC analysis unit acquires equipment information contained in the CEC command as a command parameter. The acquired equipment information is analyzed and information such as the physical address, logical address, vendor-ID and equipment name is supplied to the equipment processing unit 125.

The equipment processing unit 125 retains the information about the connected equipment in the form of an equipment management table. In the first embodiment, when it is detected that the AV amplifier is connected, audio output performance information of the AV amplifier is also acquired. Audio output performance information includes, for example, the output audio channel number or the speaker position information which is described as "Speaker Allocation Data Block (ECA-861-D specification)" of the EDID.

FIG. 6 illustrates an example of an equipment management table retained by an equipment management unit 125 of the television device 100. When the video camera 101 is connected to the HDMI port 105 of the television device 100 and the AV amplifier 102 is connected to the HDMI port 106 (refer to FIG. 1), an equipment management table as shown in FIG. 5 is produced. More precisely, the control unit 108 acquires a logical address "4" showing the device type "Playback Device (DVD)" from the video camera 101 connected to the HDMI port 105. Furthermore, a logical address "5" showing the device type "Audio System" is acquired from the AV amplifier 102 connected to the HDMI port 106. Audio output performance information "5.1 ch" and speaker position information "FL (Front Left), FR (Front Right), BL (Back Left), BR (Back Right), C (Center), LFE (Low Frequency Effect)" are acquired from the AV amplifier 102.

Next in step S503, the control unit 108 confirms that an AV amplifier 102 of the device type "Audio System" is included in the connected equipment and the process proceeds to step S504. In step S504, the control unit 108 compares audio output performance information "5.1 ch" of the AV amplifier 102 with "2 ch" audio output performance information of the television device 100. The "2 ch" audio output performance information of the television device 100 is pre-stored in the EDID-ROM 123 and 124. When the audio output performance of the AV amplifier 102 is superior to the audio output performance of the television device 100 (when the output audio channel number is greater), the process proceeds to step S505.

In step S505, the control unit 108 rewrites the information stored in the EDID-ROM 123 of the HDMI port 105 which is different from the HDMI port 106 connected to the AV amplifier 102. More precisely, the "2 ch" audio output performance information of the television device 100 stored in the EDID-ROM 123 is rewritten to the audio output performance information "5.1 ch" of the AV amplifier 102. As a result, it looks like the television device 100 is provided with an audio output performance equal to the AV amplifier 102. Therefore, the video camera 101 transmits audio data to the television device 100 in a format complying with audio output performance information "5.1 ch" of the AV amplifier 102. Thus, even when the AV amplifier 102 (audio system) and the video camera 101 (playback device) are connected in parallel to the television device 100 (audio output device), the audio data of the playback content can be output in a suitable format. In this manner, the audio effect of the playback content can be fully enjoyed. However, when audio format of the playback content in the video camera 101 is "2 ch", the "2 ch" audio data is transmitted to the television device 100.

The control unit 108 does not rewrite "2 ch" audio output performance information of the television device 100 stored in the EDID-ROM 124 from the HDMI port 106, which is connected to the AV amplifier 102. This is due to the fact that when the audio output performance information of the television device 100 stored in the EDID-ROM 124 is rewritten, the AV amplifier 102 does not recognize the "2 ch" audio output performance information of the television device 100.

Next, the operation of the television device 100 during a content playback operation in equipment connected to the television device 100 will be described.

Figure 7:
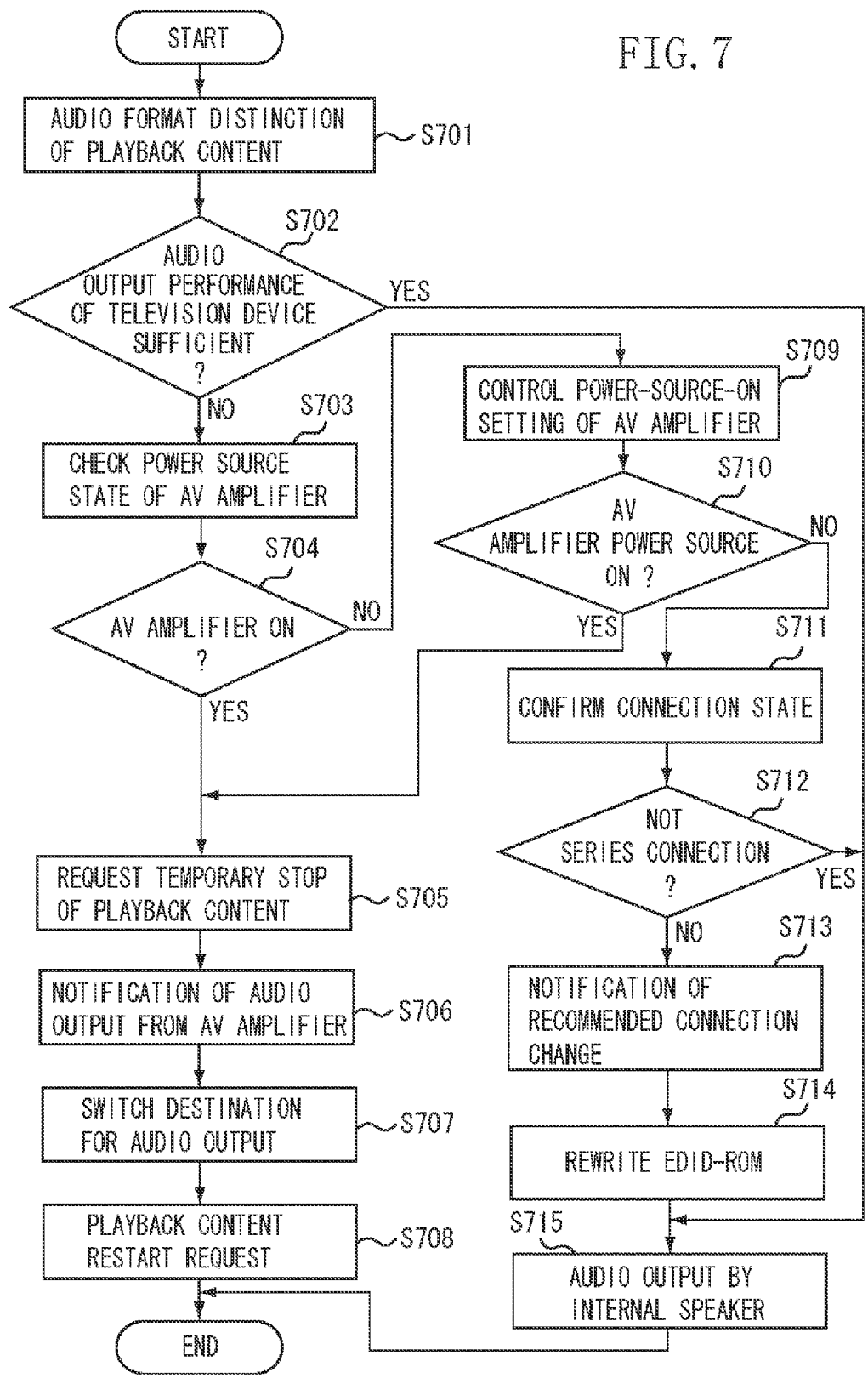
FIG. 7 is a flowchart illustrating the operation of the television device when the content within the video camera (playback device) is played back.

FIG. 7 is a flowchart illustrating the operation of the television device 100 (audio output device) when performing a playback operation of the content within the video camera 101 (playback device) connected to the HDMI port 105. The audio data and image data of the playback content is input from the video camera 101 to the HDMI port 105 through the HDMI cable.

In step S701, the control unit 108 distinguish the format of the audio data of the playback content input through the HDMI selector 114 and the TMDS line from the HDMI port 105.

Next, in a step S702, the control unit 108 compares the format of the audio data of the playback content with the "2 ch" audio output performance information of the television device 100. When the audio format of the audio data of the playback content is not compliant with the audio output performance of the television device 100, more precisely, when the number of channels of audio data of the playback content is greater than "2 ch", the process proceeds to step S703. When the audio format of the audio data of the playback content is not compliant with the audio output performance of the television device 100, more precisely, when the number of channels of the audio data of the playback content is less than or equal to "2 ch", the process proceeds to step S715.

In step S715, the control unit 108 is controlled so that audio data is output from the internal speaker (audio output unit 121) of the television device 100. The number of channels for the audio data of the playback content is less than or equal to "2 ch" when, for example, the audio data is played back in a 2 ch stereo format having L (left)-ch and R (right)-ch or a single channel monaural format. The control unit 108 may acquire audio output performance information of the television device 100 from the EDID-ROM 124 or from the equipment management unit 125.

In step S703, the control unit 108 checks the power supply state of the AV amplifier 102. When the control unit 108 inquires via the HDMI 106 whether the AV amplifier 102 is ON or on standby (or OFF), the AV amplifier 102 responds and informs the control unit of the power supply state. However, the control unit 108 may be adapted to determine whether the AV amplifier 102 is ON or in a standby state according to whether the voltage of the 5V power line of the HDMI port 106 connected to the AV amplifier 102 is "high" or "low".

When the power supply of the AV amplifier 102 is ON, the process proceeds to step S704 from step S705 and the control unit 108 requests the control unit 401 of the video camera 101 to temporarily suspend playback of content. In response to the request, the control unit 401 of the video camera 101 temporarily suspends the playback of the audio data and image data of the playback content.

Next, in step S706, the control unit 108 notifies a user that audio data for playback content is output from an external speaker of the AV amplifier 102 instead of the internal speaker of the television device 100. For example, a control operation is performed whereby a notification message is produced by the image processing unit 118 and displayed as a dialogue message on the image display unit 119. However, in step S706, an enquiry may be sent to a user regarding whether to output audio data of playback content from an external speaker of the AV amplifier 102 instead of from the internal speaker of the television device 100. When the user operates the enquiry screen to give an instruction to output audio data of playback content from an external speaker of the AV amplifier 102, the process proceeds to the next step S707. When the user gives an instruction to output from an internal speaker of the television device 100, the process proceeds to step S715.

In step S707, the control unit 108 switches the output destination for audio data received from the audio processing unit 120, to the optical digital audio output unit 122 from the audio output unit 121. Audio data input to the television device 100 from the video camera 101 through the HDMI port 105 is transmitted to the AV amplifier 102 through the optical digital terminal 107.

Next in step S708, the control unit 108 sends a request to recommence content playback by removing the temporary suspension of playback, to the control unit 401 of the video camera 101. The request command (CEC command) is exchanged between the television device 100 and the video camera 101 via the CEC line of the HDMI port 105.

On the other hand, when the AV amplifier 102 is found to be in a standby state (or power OFF state) as a result of checking the power supply state of the AV amplifier 102 in step S703, the process proceeds from step S704 to step S709. In step S709, the control unit 108 sends a power-ON request to the control unit 301 of the AV amplifier 102. The request command (CEC command) is exchanged between the television device 100 and the AV amplifier 102 via the CEC line of the HDMI port 106.

In step S710, the control unit 108 confirms whether the power supply of the AV amplifier 102 is ON. More precisely, the control unit 108 determines whether a startup notification command (CEC command) is received from the AV amplifier 102 or whether the voltage in the 5V power line of the HDMI port 106 connected to the AV amplifier 102 is "high". When the power supply of the AV amplifier 102 is ON, an operation is performed in accordance with the step S705 to 5708 above.

However, the power supply of the AV amplifier 102 may not become ON when the AV amplifier 102 does not comply with a power-ON request command from the television device 100. Thus, when the AV amplifier 102 does not react to the request, the process proceeds from step S710 to step S711. In step S711, the control unit 108 confirms the connection state of the video camera 101, the AV amplifier 102 and the television device 100 from the physical address of the video camera 101 and the AV amplifier 102.

When the video camera 101, the AV amplifier 102 and the television device 100 are not connected in series, the process proceeds from step S712 to step S713 and the control unit 108 performs a notification operation recommending a variation to the connection arrangement. More precisely, a notification message recommending series connection in the image processing unit 118 is produced and displayed as a dialogue message on the image display unit 119.

Figure 8:
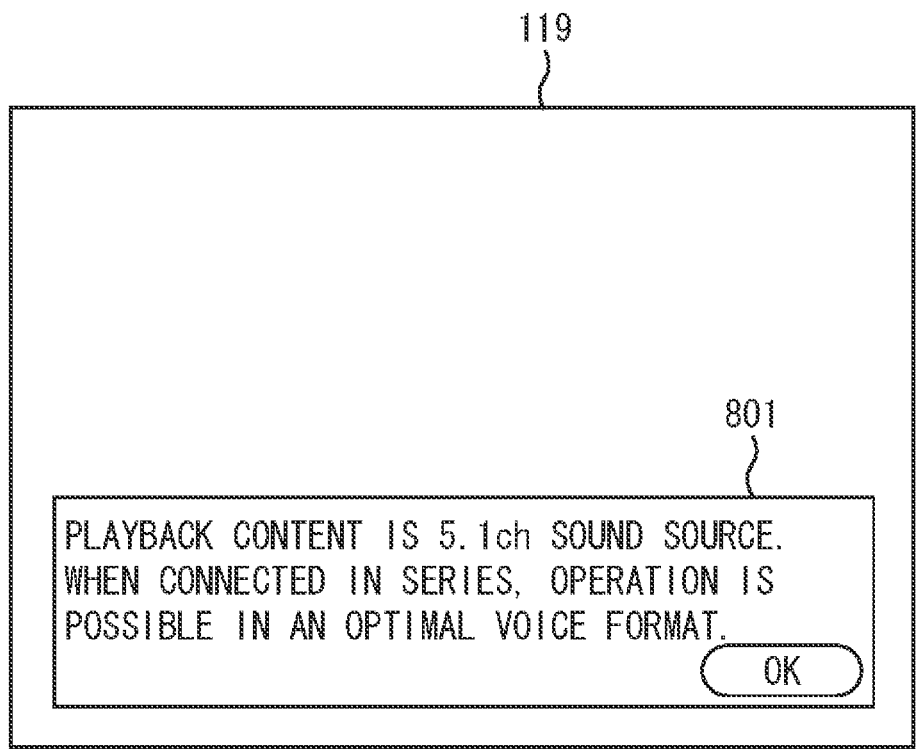
FIG. 8 illustrates a display example of a notification message recommending a connection change.

FIG. 8 illustrates an example of the display of a notification message recommending a connection change. For example, the following message may be displayed "PLAYBACK CONTENT IS 5.1 ch SOUND SOURCE. WHEN CONNECTED IN SERIES (VIDEO CAMERA 101, AV AMPLIFIER 102 AND TELEVISION DEVICE 100), PLAYBACK CAN BE CARRIED OUT IN AN OPTIMAL AUDIO FORMAT".

Next, in step S714, the control unit 108 rewrites the audio output performance information "5.1 ch" of the AV amplifier 102 stored in the EDID-ROM 123 of the HDMI port 105 connected to the video camera 101, to "2 ch" audio output performance information of the original television device 100. As a result, the video camera 101 acquires "2 ch" audio output performance information of the television device 100 in the EDID-ROM 123 and outputs audio data of the playback content to the television device 100 in a "2 ch" audio format.

In step S715, "2 ch" audio data input through the HDMI port 105 from the video camera 101 is output from the internal speaker (audio output unit 121) of the television device 100.

After rewriting the data in the EDID-ROM 123 in step S714, when a user disconnects the HDMI cable of the video camera 101 from the HDMI port 105, the control unit 108 rewrites data in the EDID-ROM 123 to audio output performance information "5.1 ch" for the AV amplifier 102.

As described above, audio data of playback content can be output in a suitable format even when an audio system (AV amplifier) and a playback device (video camera) are connected in parallel to an audio output device (television device). In this manner, the audio effect of the playback content can be fully enjoyed. When the power supply of the audio system (AV amplifier) does not become ON, a connection for the playback device, audio system and audio output device can be recommended by displayed a notification message recommending to change the connection arrangement.

In step S702, when the audio format of the audio data of the playback content is determined to be compliant with the audio output performance of the television device 100, the process automatically proceeds to step S715. However, the invention is not limited to this embodiment. For example, even when the audio format of the audio data of the playback content is determined to be compliant with the audio output performance of the television device 100, a user may make a setting to output audio data from the AV amplifier 102. Even in the event that the channel number for audio data of playback content is "2 ch", it is also possible that high quality audio data is output from an external speaker of the AV amplifier 102 rather than the internal speaker of the television device 100.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-313394 filed Dec. 9, 2008, which is hereby incorporated by reference herein in its entirety.

What is claimed is:

1. An output device comprising:
an unit that is connected to an output unit, wherein the output unit outputs audio data;
a receiving unit that receives audio data from a playback device; and
a control unit that (a) determines whether or not the output unit is able to output audio data received from the playback device, (b) detects a power state of an external device if the output unit is not able to output audio data received from the playback device, (c) notifies that audio data received from the playback device is output from the external device if the external device is in a power on state, and (d) performs a process for changing the external device to the power on state if the external device is not in the power on state.

2. The output device according to claim 1, wherein the control unit causes the external device to output audio data received from the playback device.

3. The output device according to claim 1, wherein the control unit outputs a notification for changing a connection between the external device and the output device if the external device is not in the power on state.

4. The output device according to claim 1, wherein the control unit allows the playback device to obtain first data if the external device and the output device are connected, and the control unit allows the playback device to obtain second data if the external device and the output device are not connected, and wherein the first data includes data indicating an audio output ability relating to the external device, and the second data includes data indicating an audio output ability relating to the output unit.

5. The output device according to claim 1, wherein the control unit allows the playback device to obtain first data if an audio output ability relating to the external device is more than an audio output ability relating to the output unit, and the control unit allows the playback device to obtain second data if the audio output ability relating to the external device is not more than the audio output ability relating to the output unit, and wherein the first data includes data indicating an audio output ability relating to the external device, and the second data includes data indicating an audio output ability relating to the output unit.

6. The output device according to claim 1, wherein the receiving unit receives audio data from the playback device via a TMDS line.

7. A method of controlling an output device, wherein the output device is connected to an output unit, and the output unit outputs audio data, the method comprising:
receiving audio data from a playback device;
determining whether or not the output unit is able to output audio data received from the playback device;
detecting a power state of an external device if the output unit is not able to output audio data received from the playback device;
notifying that audio data received from the playback device is output from the external device if the external device is in a power on state; and
performing a process for changing the external device to the power on state if the external device is not in the power on state.

8. The method according to claim 7, further comprising causing the external device to output audio data received from the playback device.

9. The method according to claim 7, further comprising outputting a notification for changing a connection between the external device and the output device if the external device is not in the power on state.

10. The method according to claim 7, further comprising allowing the playback device to obtain first data if the external device and the output device are connected; and allowing the playback device to obtain second data if the external device and the output device are not connected, wherein the first data includes data indicating an audio output ability relating to the external device, and the second data includes data indicating an audio output ability relating to the output unit.

11. The method according to claim 7, further comprising allowing the playback device to obtain first data if an audio output ability relating to the external device is more than an audio output ability relating to the output unit; and allowing the playback device to obtain second data if the audio output ability relating to the external device is not more than the audio output ability relating to the output unit, wherein the first data includes data indicating an audio output ability relating to the external device, and the second data includes data indicating an audio output ability relating to the output unit.

12. The method according to claim 7, wherein the output device receives audio data from the playback device via a TMDS line.

13. A non-transitory storage medium storing a program executed by for a computer, wherein the program for using the computer to perform a method of controlling an output device, wherein the output device is connected to an output unit, and the output unit outputs audio data, the method comprising:
receiving audio data from a playback device;

determining whether or not the output unit is able to output audio data received from the playback device;
detecting a power state of an external device if the output unit is not able to output audio data received from the playback device;
notifying that audio data received from the playback device is output from the external device if the external device is in a power on state; and
performing a process for changing the external device to the power on state if the external device is not in the power on state.

* * * * *